(12) United States Patent
Xing et al.

(10) Patent No.: US 8,800,416 B2
(45) Date of Patent: Aug. 12, 2014

(54) GUIDING MECHANISM FOR AN ELECTRIC TOOL

(75) Inventors: Li Xing, Nanjing (CN); Wei Dai, Nanjing (CN); Shaojun Wang, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 344 days.

(21) Appl. No.: 13/218,016

(22) Filed: Aug. 25, 2011

(65) Prior Publication Data

US 2012/0060665 A1    Mar. 15, 2012

(30) Foreign Application Priority Data

Sep. 10, 2010   (CN) .................. 2010 2 0524161 U

(51) Int. Cl.
*B27B 11/02*           (2006.01)
(52) U.S. Cl.
USPC .............. 83/821; 83/574; 238/10 E; 238/10 F
(58) Field of Classification Search
USPC .............. 30/286, 289; 83/745, 744, 743, 821, 83/581, 574, 825, 827, 828, 829, 441.1; 52/589.1; 24/615, 613, 614, 573.11, 24/573.09; 403/325, 321, 322.1, 397; 238/10 E, 10 F, 10 B, 10 R
See application file for complete search history.

(56) References Cited

U.S. PATENT DOCUMENTS

| | | | | | |
|---|---|---|---|---|---|
| 2,764,357 | A | * | 9/1956 | Katryniak | 238/10 R |
| 4,084,746 | A | * | 4/1978 | Cheng | 238/10 F |
| 4,106,695 | A | * | 8/1978 | Carella et al. | 238/10 F |
| 4,179,066 | A | * | 12/1979 | Teter | 238/10 E |
| 4,203,548 | A | * | 5/1980 | Cheng | 238/10 F |
| 4,231,517 | A | * | 11/1980 | Cheng | 238/10 F |
| 4,898,326 | A | * | 2/1990 | Edwards et al. | 238/10 E |
| 5,405,080 | A | * | 4/1995 | Yeung et al. | 238/10 F |
| 5,503,330 | A | * | 4/1996 | Riley | 238/10 E |
| 6,299,072 | B1 | * | 10/2001 | Burns | 238/10 F |
| 7,083,111 | B2 | * | 8/2006 | Reisher et al. | 238/10 F |
| 2009/0308218 | A1 | * | 12/2009 | Raff et al. | 83/745 |
| 2011/0162216 | A1 | * | 7/2011 | Lukas et al. | 30/289 |

FOREIGN PATENT DOCUMENTS

| | | | | | |
|---|---|---|---|---|---|
| EP | | 14162 A1 | * | 8/1980 | A63H 18/02 |
| EP | | 522646 A1 | * | 1/1993 | A63H 18/02 |
| GB | | 2068754 A | * | 8/1981 | A63H 19/30 |

* cited by examiner

*Primary Examiner* — Kenneth E. Peterson
*Assistant Examiner* — Jennifer Swinney
(74) *Attorney, Agent, or Firm* — Greenberg Traurig, LLP

(57) ABSTRACT

A guiding mechanism for an electric tool includes at least two guiding elements at least one of which has a first end portion having at least one protruding portion extending outwards therefrom and the other of which has a second end portion having at least one groove therein which may be engaged with the protruding portion. The groove has a cut-out and the protruding portion has an elastic clamping portion which may be engaged with the cut-out.

4 Claims, 3 Drawing Sheets

GUIDING MECHANISM FOR AN ELECTRIC TOOL

RELATED APPLICATION DATA

This application claims the benefit of CN 201020524161.8, filed on Sep. 10, 2010, the disclosure of which is incorporated herein by reference in its entirety.

BACKGROUND

The following generally relates to a guiding mechanism for an electric tool.

Portable electric tools, such as saws for cutting with circular saw blades, can be difficult to guide in a straight path, even when operated by an experienced operator. In this regard, even for experienced operators it can be difficult to get a perfect and straight cut merely by manual operation.

In order to guide a portable saw to perform a linear cutting operation on a board or other materials, various guiding mechanisms or clamping mechanisms for portable saws have been proposed. Two different kinds of guiding mechanisms, namely, an integral type and segmental type, are available in the prior art. The integral type guiding mechanism is a one-piece guiding mechanism having a constant length and generally made by aluminum extrusion, which has a higher guiding accuracy, but which is not suitable to be used for guiding on a workpiece of large length. The segmental type guiding mechanism includes several sectional guiding boards with different lengths, thus the users may assemble them freely and choose some guiding boards with different lengths to be connected together depending on the actual requirements for use and may be disassembled so as to decrease the size of packaging and to reduce the conveying cost. However, the guiding boards generally need an additional joint and the guiding boards are inserted into the two ends of the joint respectively and assembled by the screw in the joint or other fixing means. Such configuration is complex and includes many parts, and it cannot be assembled if the joint is lost.

SUMMARY

The following describes a mechanism which can achieve an assembling on the guide rail itself, that is, the mechanism may be assembled without the need for an additional joint, thus the quantity of the parts may be reduced, and the operation may be simplified to achieve a quick assembling.

To this end, a guiding mechanism for an electric tool is provided with at least two guiding elements having a first end portion with at least one protruding portion extending outwards and a second end portion with at least one groove engageable with the protruding portion wherein the groove is provided with a cut-out and the protruding portion is formed with a spring clamping portion engageable with the cut-out.

The guiding mechanism may further comprise a locking mechanism for locking the spring clamping portion within the cut-out.

The locking mechanism may comprise a locking element movable between a first position where the spring clamping portion is locked and a second position where the spring clamping portion is released.

The protruding portion may comprise a reinforcing portion, a flexible groove being formed between the reinforcing portion and the spring clamping portion, and a mating portion being formed on the locking element engageable with the flexible groove.

In the first position, the mating portion may be engaged with the flexible groove; and in the second position, the mating portion may be disengaged from the flexible groove.

The cut-out may be formed in a sidewall of the groove that is substantially perpendicular to a rear surface of the guiding element.

The guiding element may be made of plastic.

With the above technical solutions, the guiding mechanism of the present invention has a simple structure, reduced quantity of parts, and may be operated conveniently.

BRIEF DESCRIPTION

The subject device will be further explained hereinafter with reference to the accompanying drawings wherein.

DETAILED DESCRIPTION

Figure 1:
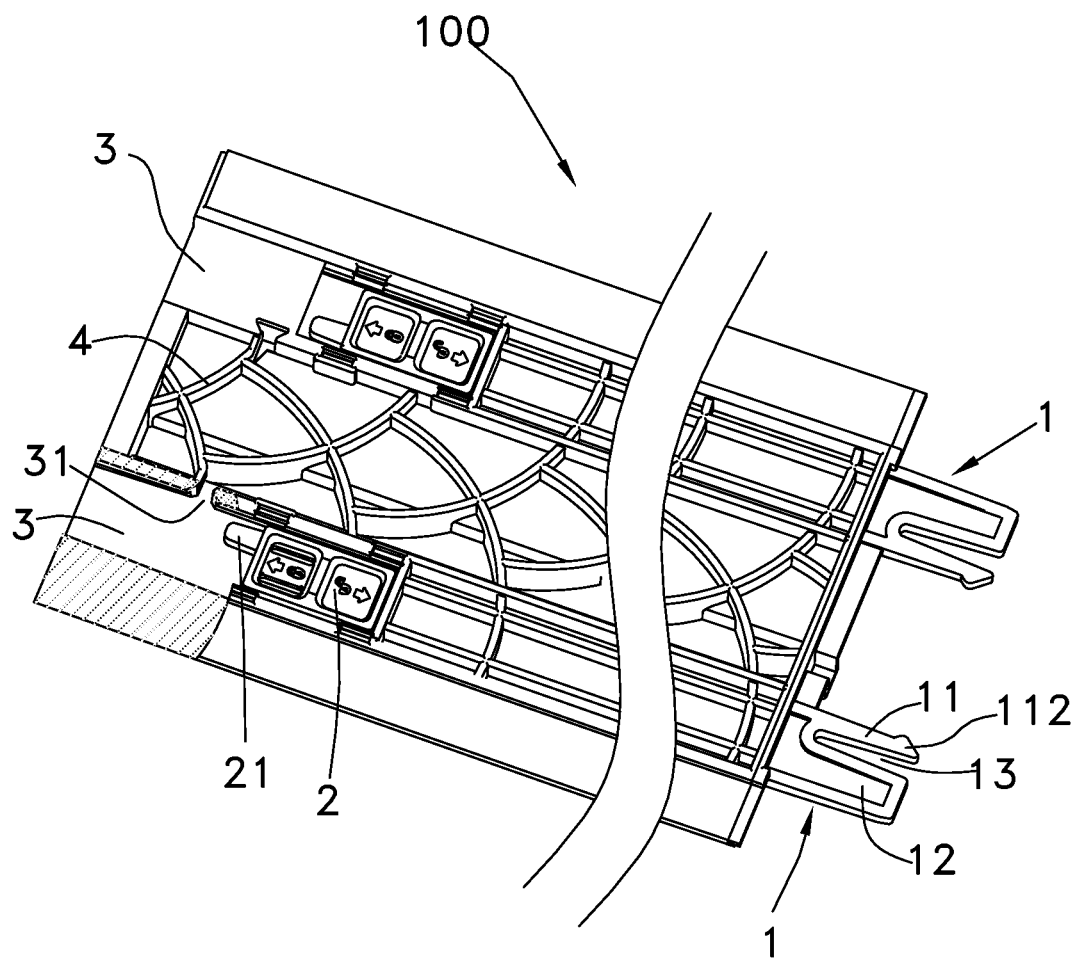
FIG. 1 is a schematic view of a guiding element of an exemplary guiding mechanism for an electric tool constructed according to the description that follows.
Figure 2:
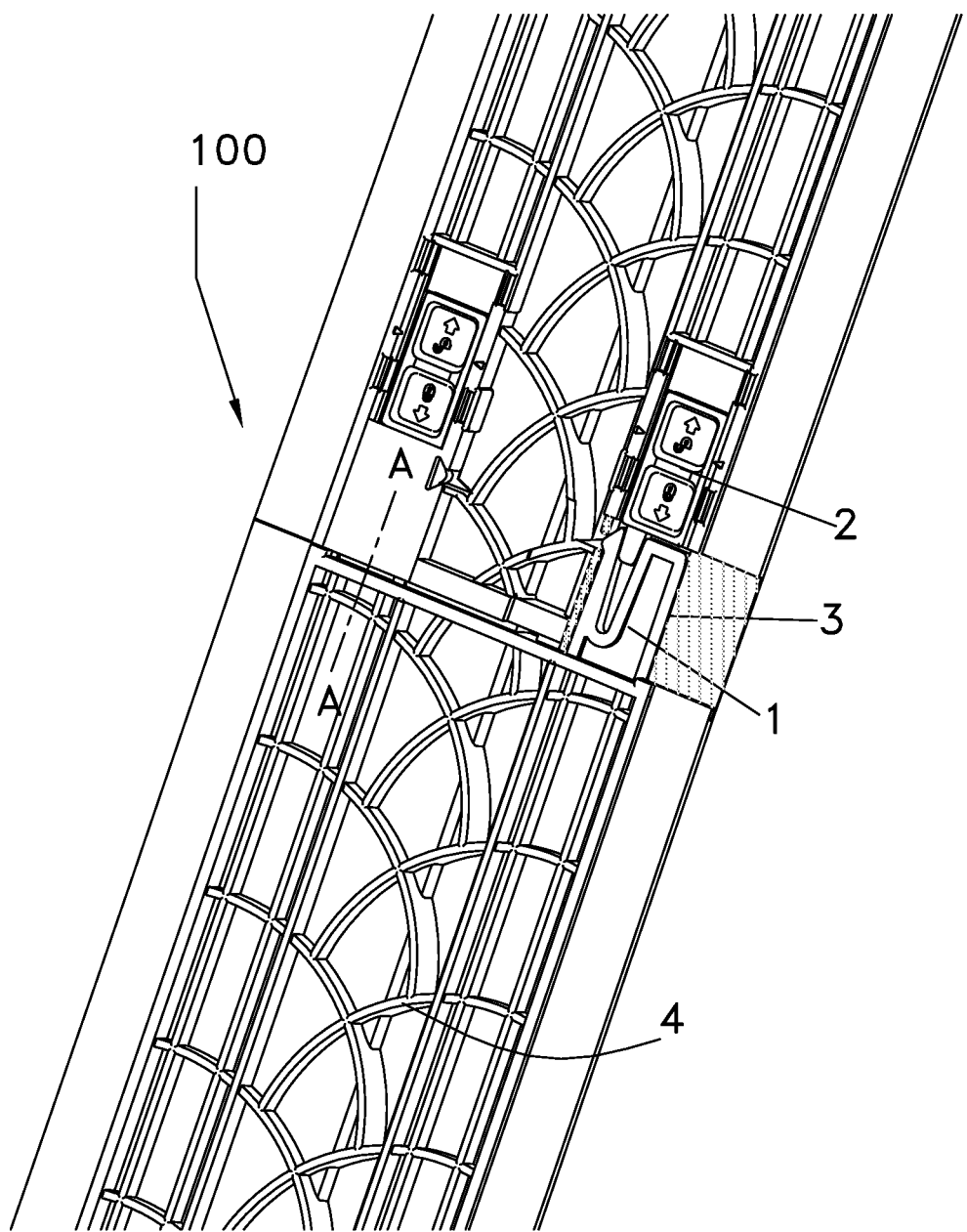
FIG. 2 is a schematic view showing the connection between two guiding elements.

As shown in FIGS. 1 and 2, the guiding mechanism comprises a guide rail 100 made of plastic. The guide rail 100 is provided on its front surface with a sliding rail (not shown) on which an electric tool such as circular electric saw may be guided to slide, and on its rear surface with a rib structure 4 for weight reduction of and a guarantee of enough strength for the guide rail 100. The guide rail 100 may be formed by two or more sections connected with each other. Each section of the guide rail 100 is provided with a protruding portion 1 at one end thereof and a groove 3 at the other end thereof, the groove 3 in one section of the guide rail 100 being engageable with the protruding portion 1 in another corresponding section of the guide rail 100. The groove 3 is formed with a cut-out 31 at its one sidewall which is substantially perpendicular to the rear surface of the guide rail 100. The protruding portion 1 includes a spring clamping portion 11 and a reinforcing portion 12. A flexible groove 13 is formed between the clamping portion 11 and the reinforcing portion 12. When the protruding portion 1 is inserted into the groove 3, a lateral protrusion 112 of the spring clamping portion is fitted within the cut-out 31, in this case, the sections of the guide rail may be substantially connected firmly. In order to make two adjacent sections of the guide rail connected more firmly and not easily pulled out in a working state, the guiding mechanism is further provided with a locking mechanism for locking the protruding portion 1 within the groove 3. The locking mechanism may be designed as a locking button 2 slidable back and forth. The locking button 2 is provided with a locking portion 21 protruding outwards. When the locking button 2 is slid to a front position, the locking portion 21 is inserted into the flexible groove 13, thus preventing the spring clamping portion 11 from disengaging with the cut-out 31. When the locking button 2 is slid to a rear position, the locking portion 21 is disengaged from the flexible groove 13, and then the clamping portion 11 may be disengaged from the cut-out 31 to allow for the sections of the guide rail 100 being disassembled under the action of a pulling force enabling each section of the guide rail to be disengaged from each other in a contrary direction.

Figure 3:
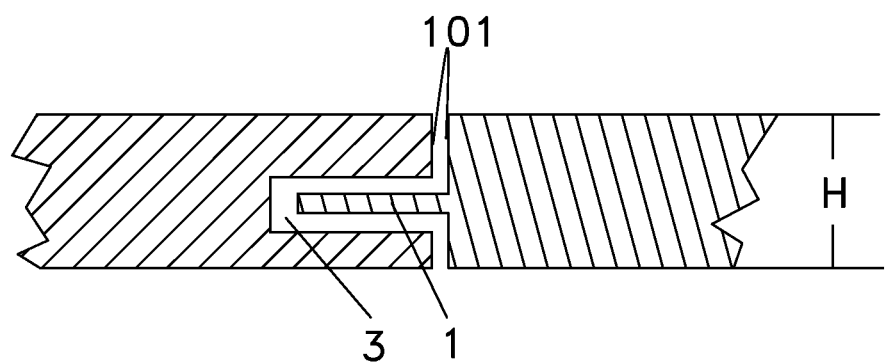
FIG. 3 is a partial sectional view of FIG. 2 taken along line A-A, showing one example of the arrangement of a protruding portion and a groove at the junction of the guiding elements.

The protruding portion 1 at one end of the guide rail 100 in the present embodiment may be formed with the body of the guide rail integratedly, or connected to the body of the guide rail by assembling. As shown in FIG. 3, the protruding portion 1 extends outwards beyond a mating face 101 of the guide rail 100. The protruding portion 1 and the groove 3 are arranged in the range of the thickness H of the body of the guide rail 100 in the direction of the thickness H. The bottom surface of the groove 3 is flush with the bottom surface of the body of the guide rail 100.

Figure 4:
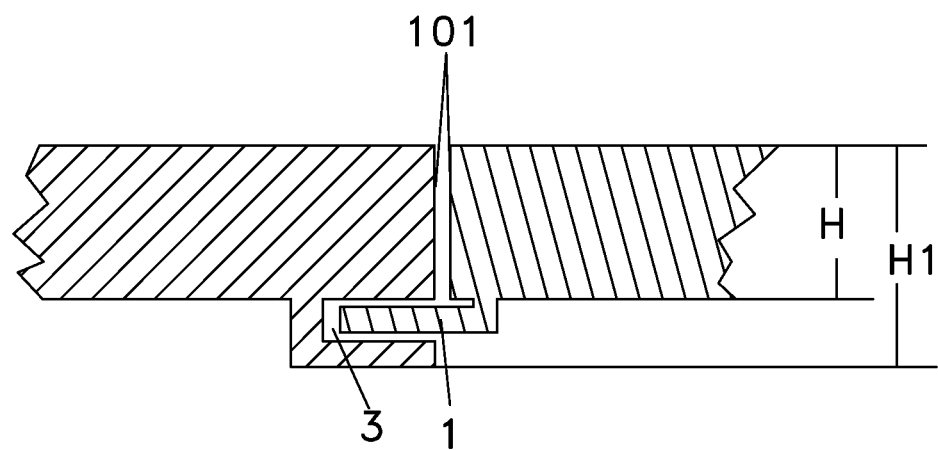
FIG. 4 shows another example of the arrangement of the protruding portion and the groove at the junction of the guiding elements.

As shown in FIG. 4, the protruding portion 1 and groove 3 at the junction of the guide rails 100 may also not be arranged in the range of the thickness H of the guide rail 100 in the direction of the thickness H. For example, the height between the top surface of the guide rail 100 and the bottom surface of the groove 3 is H1 which is larger than H, thus the groove 3 and the protruding portion 1 are all arranged below the bottom surface of the guide rail 100.

The above descriptions and drawings only show a preferred embodiment of the present invention which is not intend to limit the scope of this invention. Rather, a person skilled in the art may appreciate many replacements and modifications of the preferred embodiment without departing from the spirit and the scope of the invention which is to be defined by the claims which follow.

What is claimed is:

1. A guiding mechanism for an electric tool, comprising:
    at least two guiding elements, each guiding element having a first end portion with at least one protruding portion extending outwards, and a second end portion with at least one groove engageable with the at least one protruding portion, wherein the groove is provided with a cut-out, and the at least one protruding portion is formed with a spring clamping portion engageable with the cut-out; and
    a locking mechanism for locking the spring clamping portion within the cut-out, the locking mechanism comprising a locking element movable between a first position where the spring clamping portion is locked and a second position where the spring clamping portion is released,
    wherein the at least one protruding portion further comprises:
        a reinforcing portion;
        a flexible groove formed between the reinforcing portion and the spring clamping portion; and
        a locking portion being formed on the locking element engageable with the flexible groove.

2. The guiding mechanism for an electric tool according to claim 1, wherein in the first position the locking portion is engaged with the flexible groove and in the second position the locking portion is disengaged from the flexible groove.

3. The guiding mechanism for an electric tool according to claim 1, wherein the cut-out is formed in the sidewall of the groove which is substantially perpendicular to the rear surface of the guiding element.

4. The guiding mechanism for an electric tool according to claim 3, wherein the guiding element is made of plastic.

* * * * *